United States Patent [19]

Fulop

[11] Patent Number: 5,525,217
[45] Date of Patent: Jun. 11, 1996

[54] HOLDER FOR DEBRIS REMOVING DAM FOR SWIMMING POOLS

[76] Inventor: Laszlo Fulop, 51 Florence Ave., Massapequa, N.Y. 11758

[21] Appl. No.: 404,057

[22] Filed: Mar. 14, 1995

[51] Int. Cl.⁶ ........................... B01D 35/00
[52] U.S. Cl. ............ 210/169; 210/242.1; 4/490; 4/496; 248/231.21
[58] Field of Search ............... 210/169, 242.1, 210/416.2; 4/490, 496; 15/1.7; 248/231.21

[56] References Cited

U.S. PATENT DOCUMENTS

| | | | |
|---|---|---|---|
| 1,855,751 | 4/1932 | Buchanan | 248/231.21 |
| 3,152,076 | 10/1964 | Kreutzer | 210/169 |
| 3,244,284 | 4/1966 | Shaffer | 210/169 |
| 3,774,767 | 11/1973 | Field | 210/169 |
| 4,068,327 | 1/1978 | Heinlein | 210/169 |
| 4,221,662 | 9/1980 | Joseph | 210/169 |
| 4,225,436 | 9/1980 | Cseh | 210/169 |
| 4,379,749 | 4/1983 | Roth | 210/169 |
| 4,455,695 | 6/1984 | Mikhel | 210/169 |
| 4,720,340 | 1/1988 | O'Brien | 210/169 |
| 4,734,189 | 3/1988 | Page, Jr. | 210/169 |
| 4,757,990 | 7/1988 | Dosch | 248/231.21 |
| 4,789,470 | 12/1988 | Wards | 210/169 |
| 4,879,028 | 11/1989 | Gibson | 210/169 |
| 4,904,379 | 2/1990 | Ward | 210/169 |
| 4,960,514 | 10/1990 | Paskert | 210/169 |
| 5,059,314 | 10/1991 | Beckman | 210/169 |
| 5,336,400 | 9/1994 | Patrice | 210/169 |
| 5,391,296 | 2/1995 | Rotundo et al. | 210/169 |
| 5,392,471 | 2/1995 | Vos | 210/169 |

Primary Examiner—Robert J. Popovics
Attorney, Agent, or Firm—Jules M. Mencher; Alfred M. Walker

[57] ABSTRACT

A debris collecting device for a swimming pool skimmer includes a floating elongated dam insertable in a dam holder. The dam holder is inserted into the skimmer's cavity of a swimming pool, having a through-the-wall skimmer opening, for a filter pump. The location of the floating dam increases the efficiency of the pool pump skimming function, by catching and directing floating debris on the pool's surface in its reach thru the skimmer's opening, into the filter pump, therefore cutting running time of the pump, saving energy and cost for pool owners. The holder itself is adjustable for most sizes of through-the-wall skimmer/filter inlet cavities. A readily available broomstick screwed into holder acts as the floating dam, reaching into the pool at a slight angle projecting toward the flow of water. An optional directional water return outlet is provided, to increase the effect of the floating dam.

7 Claims, 2 Drawing Sheets

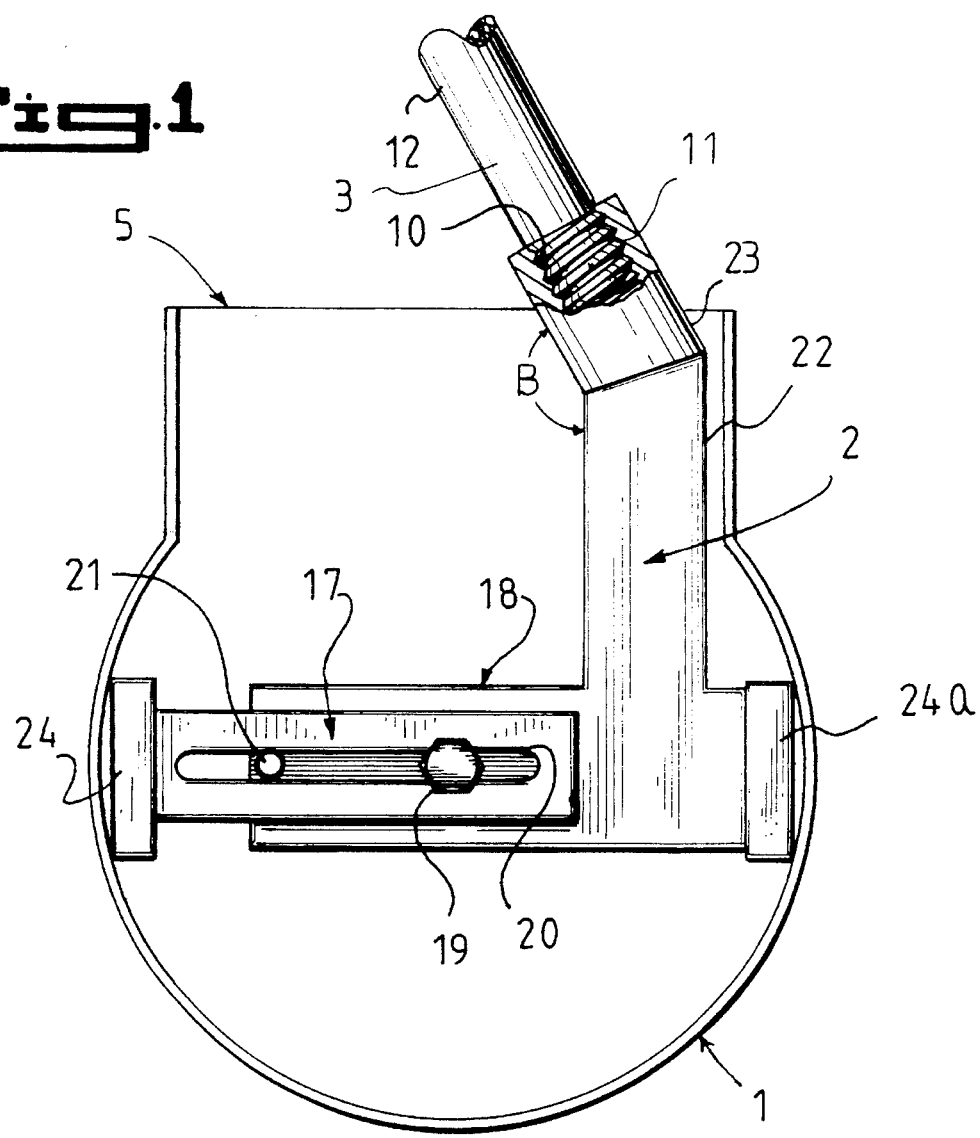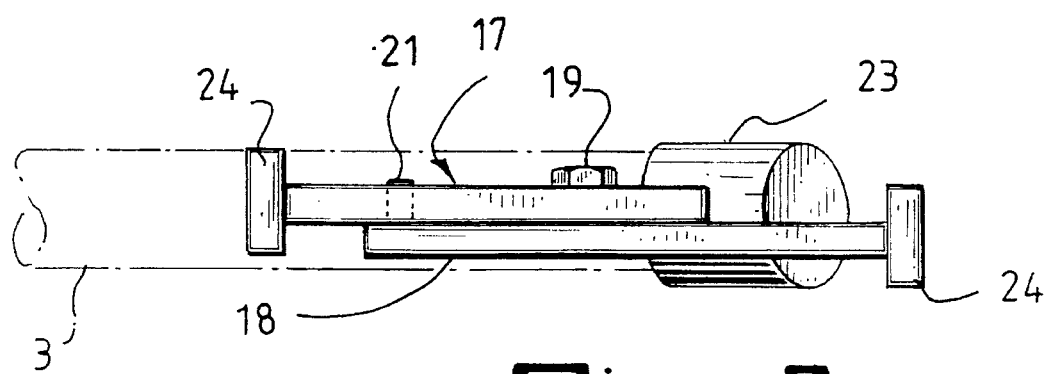

HOLDER FOR DEBRIS REMOVING DAM FOR SWIMMING POOLS

FIELD OF THE INVENTION

The present invention relates to a debris collecting holder for an elongated dam associated with a swimming pool skimmer. The device includes a holder for the floating dam, which is inserted into the skimmer's cavity of any swimming pool with a through-the-wall skimmer opening, for collecting and directing the flow of floating swimming pool debris, such as leaves.

The positioning of the floating dam increases the efficiency of the pool pump skimming function by catching and directing all floating debris on the pool's surface in the elongated dam's reach through the skimmer's opening into the filter pump, therefore cutting the running time of the pump, while saving energy and costs for pool owners.

The dam holder itself is adjustable for most size of through-the-wall skimmer/filter inlets. Made of corrosion resistant materials, the dam holder is equipped with a standard female thread to receive an elongated dam, such as a regular wooden broomstick.

The readily available broomstick dam is screwed into a dam holder to form the floating dam, while reaching into pool at a slight angle projecting toward the flow of water. An optional directional water return outlet may be provided, to increase the effect of the dam.

BACKGROUND OF THE INVENTION

Conventional swimming pools reduce floating debris by providing a debris skimmer, such as a suction filter device, at one or several portions of a pool. However, unless the floating debris is in the vicinity of the suction filter pump, the debris does not get pulled into the pump and away from the surface of the swimming pool.

Therefore, it is necessary to use time consuming manual rakes or vacuum cleaners to reduce floating debris from the surface of a swimming pool.

There is therefore a long felt need for a debris collecting dam for a swimming pool skimmer, which directs floating debris into the vicinity of a swimming pool water inlet hole, so that the floating debris can be removed in a more efficient way from the surface of the swimming pool.

OBJECTS OF THE INVENTION

It is therefore an object of the present invention to provide an improved dam holder for a swimming pool skimmer dam holder.

It is another object of the present invention to provide a holder for a floating dam which is inserted into the skimmer's cavity of a swimming pool, with a through-the-wall skimmer opening.

It is yet another object of the present invention to position a dam to increase the efficiency of the pool pump debris skimming function.

It is yet a further object of the present invention to catch and direct floating swimming pool debris on the pool's surface in its reach, through an opening into a swimming pool filter pump.

It is another object of the present invention to reduce running time of a swimming pool pump, thereby saving energy and costs for pool owners.

It is a further object of the present invention to provide a holder for dams for swimming pool skimmers, which is adjustable for most sizes of through-the-wall skimmer/filter inlet cavities.

It is a further object of the present invention to provide a corrosion resistant dam holder for a dam for a swimming pool skimmer.

It is another object of the present invention to provide a dam holder which may receive a debris collecting dam, such as a regular wooden broomstick, that by it's nature will float, thereby creating a floating debris collecting dam to direct the flow of debris to a collection cavity of a swimming pool.

It is yet another object of the present invention to provide a holder for a dam for a swimming pool skimmer, which increases the effect of the dam in conjunction with the swimming pool skimmer.

Furthermore, it is another object of the present invention to provide a holder for a dam for a swimming pool skimmer, which improves over the prior art.

SUMMARY OF THE INVENTION

In keeping with these objects and others which may become apparent, the present invention provides an improved holder for a debris collecting dam for a swimming pool skimmer, for holding a floating dam, which dam holder is inserted into the skimmer's cavity of any swimming pool with a through-the-wall skimmer opening.

The positioning of an elongated, floating dam increases the efficiency of the pool pump skimming function, by catching and directing all floating debris on the pool's surface in its reach, through the skimmer's opening into the filter pump, therefore cutting the running time of the pump, while saving energy and costs for pool owners.

The dam holder itself is adjustable for most sizes of through-the-wall skimmer/filter inlets. The dam holder is made of a corrosion resistant material, such as plastic or the like, and it is equipped with a standard female thread to receive a floating dam, such as a regular wooden broomstick therein, so that the dam, such as the wooden broomstick, may float upon the surface of the swimming pool water. The dam collects and directs any floating debris into a sector of the pool water defined by an edge of the swimming pool on one side and the floating elongated dam on the other, wherein the sector converges to a point at the water inlet suction filter pump, thus directing any floating debris into the water inlet suction filter pump.

The floating dam is therefore preferably made from any readily available broomstick, which is screwed into the dam holder, reaching into the pool water at a slight angle projecting toward the flow of water.

An optional directional water return outlet may be provided, to direct the flow of water around the surface of the pool to the area of the floating dam, thereby increasing the efficiency of the dam.

As a result, the present invention provides an improved holder for a dam used in conjunction with a swimming pool skimmer, which is inserted into the skimmer's cavity of any swimming pool with a through-the-wall skimmer opening.

DESCRIPTION OF THE DRAWINGS

The invention may be best understood from the following drawings, in which:

FIG. 1 is a top plan view of a dam holder used in conjunction with a swimming pool skimmer, of the present invention.

FIG. 2 is a side elevational view of the swimming pool dam holder as in FIG. 1.

DETAILED DESCRIPTION OF THE DRAWINGS

Figure 3:
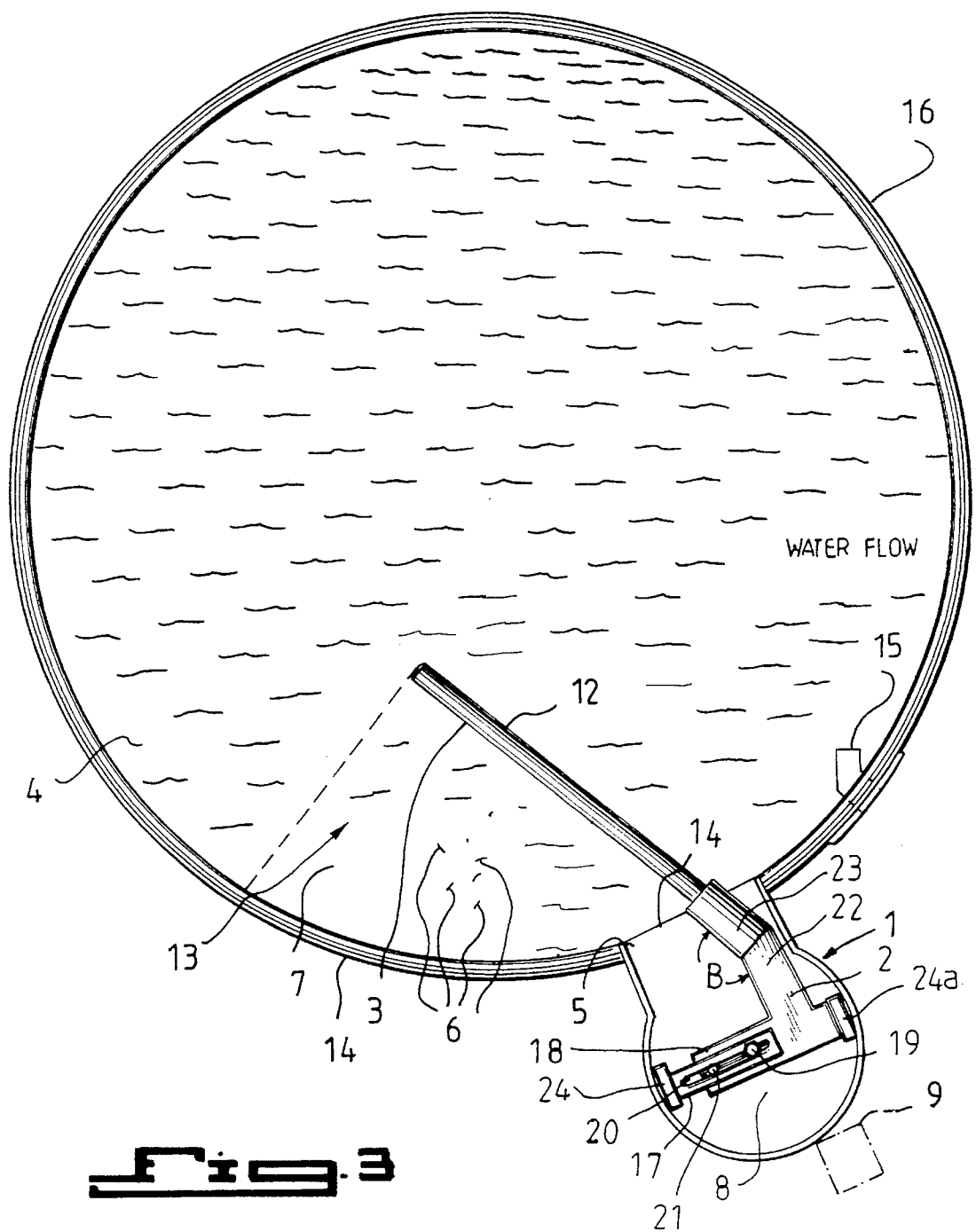
FIG. 3 is a top plan view of the swimming pool skimmer dam holder of the present invention, shown in place in a swimming pool.

As shown in FIGS. 1–3, there is provided a swimming pool debris collecting device 1, including a dam holder 2 for an elongated floating dam 3, which holder 2 is insertable into a skimmer's water inlet cavity of a swimming pool 4 with a through-the wall opening for a swimming pool skimmer.

The positioning of elongated dam 3, such as a floating rod 12, increases the efficiency of the pool pump skimming function by catching and directing all floating debris 6 on the surface 7 of pool 4, in the vicinity of elongated floating dam 3, through skimmer outlet opening 5 of pool 4, having a suction filter pump 9.

Dam holder 2 is adjustable for most sizes of through-the-wall skimmer/filter water inlet cavity 8. Dam holder 2 may be made of a corrosion resistant material, such as plastic or the like.

Dam holder 2 includes a standard female threaded cavity portion 10 to receive a floatable debris collecting dam 3, such as an elongated rod or a wooden broomstick, therein, so that floatable dam 3 may float upon surface 7 of swimming pool water of swimming pool 4, thereby directing any floating debris 6 into sector 13 of the swimming pool water surface defined by an edge 14 of swimming pool 4 on one side and floatable dam 3 on the other. Sector 13 converges to a point at water inlet opening 5 having suction filter pump 9, thus directing floating debris 6 through filter skimmer wall opening 5, into water inlet skimmer cavity 8 into suction filter pump 9.

Floatable dam 3 may preferably be made from any readily available wooden broomstick, which dam 3 is screwed into skimmer dam holder 2. Floatable dam 3 extends into swimming pool 4, away from swimming pool wall 14, at slight angle, "A".

Optional directional water return outlet 15 may be provided, to direct the flow of water around edge 16 of swimming pool 4 to the vicinity of floating dam 3, thereby increasing the efficiency of debris collecting device 1.

To accommodate any size water inlet hole opening 5, and any size water inlet cavity 8, dam holder 2 includes an extendable, movable locking brace 17 and base portion 18, wherein locking brace 17 is securable to base portion 18 by means of fastener 19, such as a positioning/holding nut or a wing nut, which fastener 19 is insertable within a longitudinally extending receptacle 20 within the locking brace 17. Movable arm locking brace 17 is slidably movable along base portion 18, to increase or decrease the extending length of dam holder 2. To limit the movement of movable locking brace 17, a guiding straight pin 21 is provided within longitudinally extending into receptacle 20.

Extending in a transverse direction from base portion 18 there is provided extension piece 22 having at a distal end 23 thereof female threaded portion 10 for insertion of floatable skimmer dam 3 therein. Female threaded portion 10 extends obliquely from extension piece 22 of holder 2, to accommodate angle "B" for floatable dam 3.

Contact pieces 24, 24a are provided at opposite ends of movable arm holding brace 17 and base portion 18 of holder 2 to securely position dam holder 2 within water inlet cavity 8 of a swimming pool skimmer.

The positioning of floatable dam 3 increases the efficiency of the pool pump skimming function by catching and directing floating debris 6 on surface 7 of a swimming pool, through water inlet opening 5 into suction filter pump 9, therefore cutting the running time of pump 9, which saves energy and costs for pool owners.

It is noted that other modifications may be made to the present invention, without departing from the scope of the present invention, as noted in the appended claims.

I claim:

1. A swimming pool debris collecting device for catching and directing floating debris on a surface of water contained in a swimming pool, into a skimmer inlet in a wall of said swimming pool, said device comprising:

a floating dam;

a holder for holding said floating dam, said holder being insertable into a cavity of said skimmer and having a female portion for receiving a male portion of said floatable dam, said holder including means for adjusting said holder comprising an extendable locking brace, said extendable locking brace including a base portion and a movable arm, said movable arm being removably securable to said base portion by means of a fastener, said fastener being insertable within a longitudinally extending receptacle within said arm portion, said movable arm being slidably movable along said base portion to increase or decrease an extending length of said holder within said cavity, a means to limit movement of said movable arm comprising a straight pin being insertable within said longitudinally extending receptacle, said holder further including an extension piece extending in a transverse direction from said base portion, said extension piece having a distal end, with said female portion being located thereat;

wherein said floatable dam and an edge of said pool form an angular section which converges at said skimmer inlet, thereby directing floating debris into said skimmer cavity and then into a swimming pool filter pump.

2. The debris collecting device as in claim 1, wherein said floating dam is a wooden broomstick.

3. The debris collecting device as in claim 1, further comprising a directional water return outlet to direct the flow of water around an edge of the swimming pool to said angular section.

4. The debris collecting device as in claim 1 wherein said female portion extends obliquely from said extension piece of said holder.

5. The debris collecting device as in claim 1 further comprising at least one contact piece provided at an end of said holder to securely position said holder within said cavity of the skimmer of the swimming pool.

6. The debris collecting device as in claim 1, wherein said holder is made from a plastic material.

7. The combination of a pool skimmer and a swimming pool debris collecting device for catching and directing floating debris on a surface of water contained in a swimming pool, through a skimmer inlet and into a cavity defined by said skimmer which passes through a wall of said swimming pool and is connected to a swimming pool filter pump, said device comprising:

a floating dam;

a holder for holding said floating dam, said holder being insertable into said skimmer cavity and having a female portion for receiving a male portion of said floatable dam, said holder including means for adjusting said holder comprising an extendable locking brace, said extendable locking brace including a base portion and a movable arm, said movable arm being removably securable to said base portion by means of a fastener, said fastener being insertable within a longitudinally extending receptacle within said arm portion, said movable arm being slidably movable along said base portion to increase or decrease an extending length of said holder within said cavity;

wherein said floatable dam and an edge of said pool form an angular section which converges at said skimmer inlet, thereby directing floating debris into said skimmer cavity and then into said swimming pool filter pump.

* * * * *